United States Patent
Mohamed

(10) Patent No.: US 10,887,345 B1
(45) Date of Patent: Jan. 5, 2021

(54) PROTECTING USERS FROM PHISHING ATTEMPTS

(71) Applicant: PAYPAL, INC., San Jose, CA (US)

(72) Inventor: Riaz Ebrahim Mohamed, Singapore (SG)

(73) Assignee: PAYPAL, INC., San Jose, CA (US)

(*) Notice: Subject to any disclaimer, the term of this patent is extended or adjusted under 35 U.S.C. 154(b) by 7 days.

(21) Appl. No.: 16/453,835

(22) Filed: Jun. 26, 2019

(51) Int. Cl.
*H04L 29/06* (2006.01)
*G06F 9/451* (2018.01)

(52) U.S. Cl.
CPC .......... *H04L 63/1483* (2013.01); *G06F 9/451* (2018.02); *H04L 63/083* (2013.01); *H04L 63/1416* (2013.01)

(58) Field of Classification Search
CPC ............... H04L 63/1483; H04L 63/083; H04L 63/1416; G06F 9/451
USPC ............................................................ 726/6
See application file for complete search history.

(56) References Cited

U.S. PATENT DOCUMENTS

| | | | | |
|---|---|---|---|---|
| 9,736,131 | B2* | 8/2017 | Khalid | H04L 63/0807 |
| 9,882,894 | B2* | 1/2018 | Yin | H04L 9/3247 |
| 2005/0033983 | A1* | 2/2005 | Takekawa | G06F 21/78 726/2 |
| 2006/0288213 | A1* | 12/2006 | Gasparini | H04L 63/12 713/170 |
| 2007/0005984 | A1 | 1/2007 | Florencio et al. | |
| 2015/0089621 | A1* | 3/2015 | Khalid | H04L 63/0807 726/9 |
| 2015/0237032 | A1* | 8/2015 | Walter | H04L 65/1069 726/6 |

* cited by examiner

*Primary Examiner* — Teshome Hailu
(74) *Attorney, Agent, or Firm* — Haynes and Boone, LLP

(57) ABSTRACT

Systems and methods for anti-phishing include determining that a user interface corresponding to a current web address has authentication input fields. A current hash value is generated based on a subset of a plurality of input characters that have been input into an authentication input field. The current hash value is compared to mapped hash values. If the current hash value matches one or more of the mapped hash values, a web address mapped to the matched, mapped hash value is identified. The mapped web address is compared to the current web address to determine whether they match. An alert is displayed in response to determining whether there is a match between the current web address and the mapped web address.

20 Claims, 5 Drawing Sheets

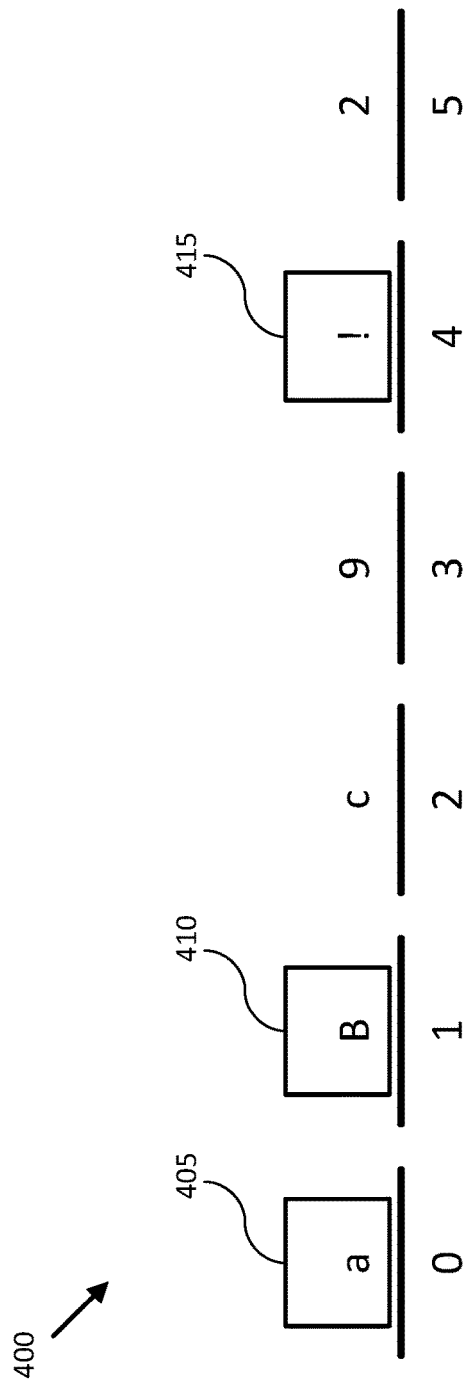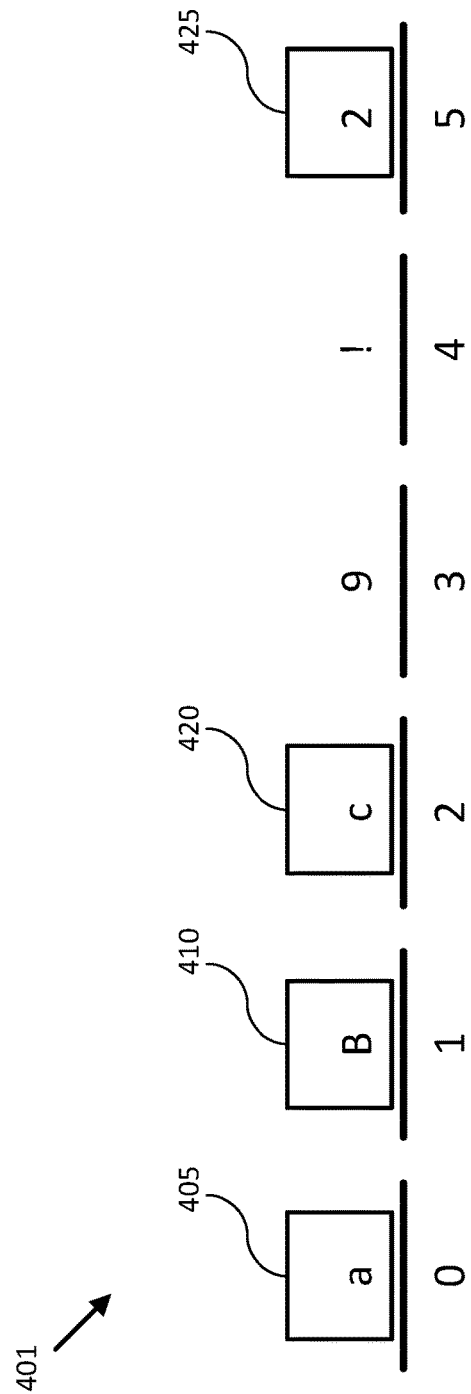
Fig. 4A
Fig. 4B

US 10,887,345 B1

PROTECTING USERS FROM PHISHING ATTEMPTS

TECHNICAL FIELD

The present disclosure generally relates to electronic device security and more particularly to minimizing successes of phishing attacks according to various embodiments.

BACKGROUND

Many instances of identity theft are caused by online phishing traps. Phishing is a technique where a malicious party poses to a user as a legitimate service provider with which the user has an account, usually by providing a presentation (e.g., a web page interface, an e-mail, etc.) that matches the look and feel of one generated by the legitimate service provider. The malicious party then requests the user to provide sensitive information (e.g., a user name, a password, etc.) via the presentation. With the information provided by the user, the malicious party may then take over the user account to perform transactions, such as withdrawing money, that cause monetary and other losses to the user, as well as computing time and resources of a service provider needed to address and handle the phishing attacks, including protecting the service provider from future attacks and/or taking measures with the user account, such as crediting the user account and providing additional safeguards to subsequent attacks.

BRIEF DESCRIPTION OF THE FIGURES

FIGS. 4A and 4B illustrate example authentication inputs including a plurality of input characters in accordance with one or more embodiments of the present disclosure;

Figure 1:
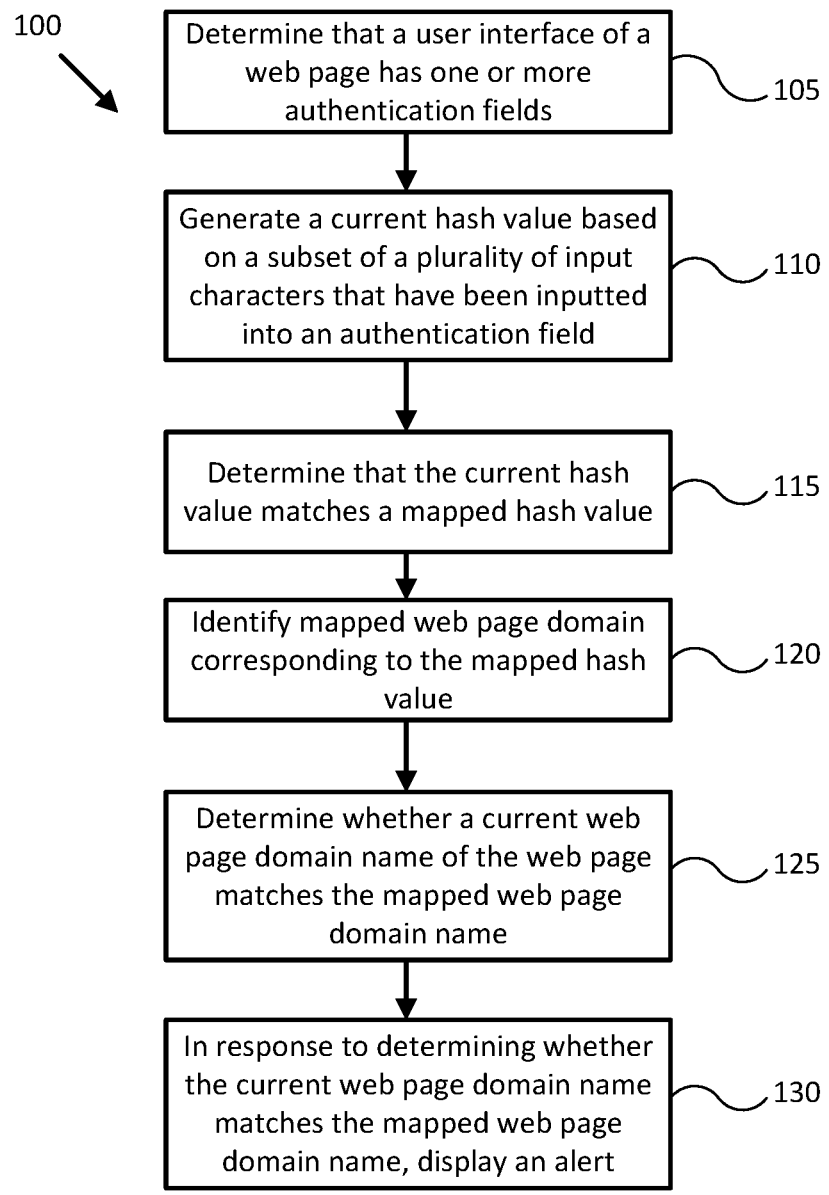
FIG. 1 illustrates a flow diagram of a process for preventing a phishing attempt in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Phishing is a method of attempting to steal sensitive information, such as usernames, passwords, contact information, answers to security questions, user identifiers, and financial information, using deceptive e-mails, websites, and/or downloadable applications. The present disclosure describes systems and methods for detecting phishing attempts by monitoring and analyzing alphanumeric characters input into an authentication field of a user interface of a phishing website or phishing application.

In some embodiments, a user may install an anti-phishing plug-in (e.g., extension, add-on) for a browsing application and set up and/or configure the plug-in's safety feature to prevent phishing attempts. The plug-in may include a graphical user interface (GUI) for creating, modifying, managing, configuring, and/or verifying parameters and options for the plug-in. As such, the plug-in may have adjustable user preferences. The GUI may prompt (e.g., request) the user for a web address for which the user wants to enable the safety feature. For example, the user may provide the web address "www.paypal.com." The GUI may then prompt the user for certain characters of the user's password for the website associated with the web address. For example, the characters requested may correspond to index values of the password for the website, where the password is a string of characters. For example, the GUI may request four characters of the user's password for the website, where the four characters correspond to a zeroth, first, fourth, and sixth index value of the password. To illustrate this example, the user's password for the website may be "PayPal#PYPL" so the user would provide "Paa#" to the GUI. The plug-in may then generate a hash value based on the provided characters to uniquely identify the password for storage in memory, while not storing the actual password in memory. Once the web address has been provided and the hash value has been generated, the web address and the hash value may be mapped to each other and stored as a map such that access to the map is exclusively limited to the plug-in. Accordingly, the anti-phishing plug-in's safety feature may be enabled for the mapped web address. Note that while a plug-in is described in various embodiments as performing various operations, in general, a service provider may provide or perform one or more of the operations without a need for a plug-in.

In some embodiments, the user may be tricked into navigating to a phishing website controlled by or associated with a phishing entity. For example, the user may be lured by electronic communications (e.g., email spoofing, instant messaging, etc.) purporting to be from trusted parties such as social web sites, merchant websites, banks, online payment service providers, or system administrators. The phishing website may direct the user to enter personal information to an authentication field of the phishing website. For example, the phishing website may request that the user provide a username and password. The user may be unaware that the phishing website is a fake website designed to match the look and feel of a legitimate website of a trusted party. In various embodiments, the plug-in determines that the user interface corresponding to the phishing website (e.g., phishing web page of the phishing website) has an authentication input field. If the plug-in detects that the authentication input field has been selected by the user, for example, to provide a password to the phishing website, then the plug-in may prevent the user interface from exchanging (e.g., transmitting) information derived from the authentication input field to an external device (e.g., a server) controlled by or otherwise associated with the phishing website/entity. Thus, even if the user inputs characters to the authentication field of the user interface, the phishing entity will not receive the input characters in real-time or at all. Real time is defined herein as substantially close to the time that an event occurs (e.g., within the last five milliseconds, within the last two milliseconds, etc.) In various embodiments, the plug-in may perform operations to detect whether the website is a phishing website while the information is prevented from being transmitted.

In some embodiments, the plug-in generates a current hash value based on a subset of the input characters provided to the authentication field. The current hash value may be compared to stored hash values of the map. If the current hash value is determined to match one or more of the stored hash values of the map, each of the matched, stored hash values may be used to identify the web address or web addresses stored in the map based on the mapping between the hash values and, web addresses.

In some embodiments, the current web address corresponding to the phishing website is compared to the identified web address or web addresses of the map. If the plug-in determines that the current web address of the phishing website does not match any of the identified web addresses of the map, then the plug-in may display an alert in the user interface to notify the user that he or she may be on a phishing website. If the plug-in determines that the phishing website web address matches one or more of the identified web addresses of the map, then the plug-in may display an alert in the user interface to indicate to the user that the phishing website is not a phishing website, but instead is a website protected by the security feature of the anti-phishing plug-in.

In various embodiments, a user may register with a website (e.g., service provider). During registration, the website may request the user to provide a protection code to map to a web address of the website. The code may be generated automatically by selecting a "generate" button on the website, or the code may be provided by the user as a user input to a website registration form. Once registration is complete, the website may communicate the protection code to an anti-phishing plug-in installed on the user's device. For example, the anti-phishing plugin may detect that the registration has been completed and may store the protection code. The anti-phishing plug-in may determine the relevant web address of the website (e.g. a "log in" page) and map such to the protection code. In the future, when the user visits the web address that was mapped, the web page associated with the web address may have a new input field that prompts the user for the protection code. The user may select an option on an interface of the plug-in, which causes the plug-in to detect any input fields on the current web page that represent a protection code input field. If the plug-in detects a protection code input field, the plug-in may determine the current web address and automatically fill the protection into the field the code mapped to the current web address. As such, the user may be protected from entering user information into fields of a phishing website. For example, when the user navigates to a phishing website, the phishing website may appear to be a legitimate website with a protection code input field. Indeed, the phishing website may appear to the user to be one protected by the plug-in's protection code feature. However, when the user selects the option on the interface of the plug-in to automatically fill the mapped protection code into the protection code field, the plug-in will determine that the phishing web address is not a mapped web address, and therefore, will not have a protection code to enter into the protection code field.

Referring now to FIG. 1, a flow diagram of process 100 for preventing phishing is illustrated in accordance with one or more embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed.

In some embodiments, process 100 includes a configuration process that occurs upon installation of an anti-phishing application plug-in (e.g., extension, add-on). For example, the application may be a web browser. As used herein, in different embodiments, a "web browser" means any software application for retrieving, presenting, or traversing digital information over a network (e.g., Firefox, Chrome, Opera, Edge, Internet Explorer, email applications, social media applications, mobile banking applications, and the like). A web browser accepts as an input a network address and provides a page display of the information available at that network address. Underlying functionality includes the ability to execute program code, such as JavaScript or the like, to allow a computing device to interact with a website at a given network address to which the browser has been "pointed."

In the configuration process, the user may be required to set up and/or register the plug-in's safety feature to prevent phishing attempts and protect personal information for web addresses. The plug-in may include a (GUI) for creating, modifying, managing, configuring, and/or verifying parameters and options in configuration files for the plug-in.

In some embodiments, the GUI prompts the user for a web address (e.g., Uniform Resource Locator (URL) address, web domain name, computer network address, internet reference, web page address) for which the user wants to enable the safety feature. For example, the user may provide the web address "www.paypal.com" in the GUI. The GUI may then prompt the user for specific characters of the user's password for the website associated with the provided web address. For example, the characters requested may correspond to index values of the password for the website, where the password is a string of characters. As a further example, the GUI may request four characters of the user's password for the website, where the four characters correspond to a zero, first, fourth, and sixth index value of the password for the website. To illustrate, the user's password for the website may be "PayPal#PYPL" so the user would provide "Paa#" to the GUI as these characters correspond to the zeroth, first, fourth, and sixth index value of the password "PayPal#PYPL." The index values may be pre-configured for the plug-in upon installation of the plug-in or, in some cases, the GUI may receive adjustments, from the user, to the index value settings as part of user preferences. In this regard, the index values may be pre-configured, or selected by the user, to suit a desired application. For example, instead of zeroth, first, fourth, and sixth index values, the plug-in may be configured to evaluate the characters corresponding to the last four characters of a password or the first four characters of a password.

Continuing with the configuration process, the plug-in receives the specific characters of the user's password (or any other personal information desired to be protected) for the website associated with the provided web address. The plug-in may then generate a hash value based on the provided characters to uniquely identify the specific characters of the password to be stored in a map. The hash value facilitates further security in utilizing the plug-in as the specific characters of passwords, much less the actual password, are not stored in the map. Once the web address desired to be protected has been provided and the hash value corresponding to the personal information desired to be protected has been generated, the web address and the hash value may be mapped to each other and stored in the map. In an aspect, access to the map is exclusively limited to the plug-in to ensure security. Further discussion of the map is discussed below in reference to FIG. 5. After the configuration process has been completed, the user may enable the safety feature of the plug-in to actively prevent phishing of the personal information associated with the protected web address.

At block 105, the plug-in determines that a user interface, corresponding to a current application identifier, has one or more authentication fields. For example, the current application identifier may be a current web address for a website. A user may have been tricked into navigating to a phishing website controlled by or associated with a phishing entity by electronic communications purporting to be from a trusted party. For example, the user may have received a spoof email or electronic message (e.g., text, instant message of social application) that directed the user to the phishing website (e.g., by hyperlink). In some cases, the spoof email or electronic message may look and feel like a legitimate email or electronic message from a trusted party. An interface of the phishing website may prompt the user to provide an authentication input (e.g., username, handle, password, financial/bank information, other personal information) into an authentication input field.

In various embodiments, the plug-in determines that the phishing website has one or more authentication input fields. For example, the plug-in may perform a screen scrape of the phishing website to determine that the phishing website has an authentication input field. In some embodiments, the plug-in may include a keyword analysis module that is utilized to analyze the displayable content on the phishing website to determine whether it includes elements for trying to collect sensitive/personal information from the user. Words or phrases that ask users to input certain information, such as login names, passwords, or other sensitive/personal information may be used in this analysis. The keyword analysis module may also examine the source codes of the web content to determine if it includes any fields for the user to input data (for example, having the <form> tag or JavaScript® for collecting user's data) and their corresponding text on display. For example, the keyword analysis module may determine that the web content includes text input fields, and the displayed text corresponding to the text input fields are "PayPal," "Login Name," and "Password," which indicates that the web content intends to collect login data for user accounts associated with the entity, PayPal. In some embodiments, the keyword analysis module may conclude that the phishing web page has one or more authentication input fields when a combination of the words "login" and a registered company's name such as "PayPal" appear on the web page.

In some embodiments, if the plug-in detects that an authentication input field has been selected by the user, for example, to provide a password, authentication input, and/or other sensitive/personal information to the phishing website, then the plug-in may prevent the user interface and/or phishing website from exchanging (e.g., transmitting) information input into the authentication input field to an external system (e.g., a server or software program) controlled by or otherwise associated with the phishing entity. Thus, even if the user inputs characters of a password to the authentication input field of the user interface of the phishing website, the phishing entity will not receive the input characters in real-time or at all. For example, the plug-in may prevent network access for the browsing tab of a web browser application that is used to navigate to the phishing website. In another example, the authentication input field that the user has selected will be rendered inactive or disabled such that any input provided to the authentication input field is unseen/inaccessible by the phishing website or phishing entity.

At block 110, the plug-in receives a plurality of input characters that have been input into an authentication field of the user interface of the phishing website and generates a current hash value based on a subset of the plurality of input characters. In some embodiments, the input characters may be received in real-time (e.g., dynamically). For example, the input characters may be received with each character that is typed/provided by the user into the authentication field. Accordingly, the plug-in may generate the current hash value in real-time or dynamically with each character as each character is input into the authentication field. In some cases, the plug-in generates the current hash value once all the required characters, according to predetermined index values established in the setup process of the plug-in, are input into the authentication input field. For example, the settings/user preferences of the plug-in may be configured such that the plug-in evaluates a zeroth, first, fourth, and sixth character of a password string. As such, the plug-in may be configured to generate the current hash value when at least a character corresponding to the last required index value (sixth in this example) has been input by the user.

In some embodiments, the plug-in generates an overlay that is disposed over the authentication field of the phishing website such that the user may input characters into the plug-in's overlay instead of the phishing website user interface. In some cases, the overlay completely hides the authentication input field such that there is no distinction between the overlay and the authentication field of the phishing website user interface. In other cases, the overlay may be highlighted or show a visual indication to the user that the overlay is part of a safety feature of the plug-in. The overlay may be controlled by the plug-in. In various embodiments, when the plug-in has determined that the current page is not a phishing web page, the input provided to the overlay may be seamlessly transmitted to the authentication field of the current web page for submission by the user.

At block 115, the plug-in determines that the current hash value matches a mapped hash value based on a comparison between the current hash value and the mapped hash values of the map. If the current hash value is determined to match one or more mapped hash values stored in the map, each of the matched, mapped hash values may be used to identify the web address(es) stored in the map based on the mapping between the mapped hash values and stored web address(es).

If the current hash value does not match any of the mapped hash values stored in the map, the plug-in may display an alert in the user interface indicating that the current web address is not a protected web address. The alert may further prompt the user to add a new mapping between the current web address and the current hash value. In some cases, the plug-in may identify the current web address as a known phishing web address. For example, past phishing attempts may be recorded in a user history profile and recalled in future phishing encounters. In this regard, the current web address may be compared to known phishing web addresses identified in a historic profile for the user. As another example, the plug-in may request from an online database, associated with the plug-in, known phishing web addresses that may be compared to the current web address.

At block 120, the plug-in identifies mapped web addresses corresponding to the mapped hash value(s) that were determined to match the current hash value. For illustrative purposes, the current hash value may be "kt9d2f2ff43" which may be determined to match a mapped hash value of "kt9d2f2ff43." The web address mapped to "kt9d2f2ff43" in the map may then be identified based on the mapping between the web address and the mapped hash value.

A hash function suitable for a desired application of the present disclosure may be used for the generation of hash values. The hash function may facilitate verifying whether input data matches a mapped/stored hash value. It should be appreciated that if the input data to a hash function is unknown, reconstructing the input data by knowing the stored hash value is deliberately difficult and mostly impossible. As such, hash functions provide numerous benefits for protecting sensitive information as the input data need not be stored. Hash values as used herein may also be referred to as hash codes, digests, or hashes.

At block 125, a determination is made as to whether the current web address corresponding to the phishing website matches the mapped web address(es) of the map identified at block 120. For example, the current web address may be compared to each of the identified mapped web addresses to determine if there is a match. As an illustration, the current web address may be "http://paypal.com/login" where the "1" (one) in "paypal" is intended to trick the user into believing that he/she is on the legitimate website of "http://paypal.com/login" as the "1" (one) appears to look like a lowercase "L." The user may have the legitimate web address "http://paypal.com/login" protected by the safety feature of the plugin and stored in the map. As such, the plugin may compare the current web address of "http://paypal.com/login" to the mapped web address of "http://paypal.com/login" and determine that they do not match. In some cases, the plugin compares each character of the string of characters for the current web address to each character of the string of characters of the mapped web address to determine if both strings are the same.

At block 130, if the plug-in determines that the current web address of the phishing website does not match any of the identified web address(es) of the map, then the plug-in may display an alert in the user interface of the browser application to notify the user that he or she is on a phishing website. In some embodiments, the alert may ask the user to confirm whether he/she believes the website is a phishing website. If the user indicates that the current website is not a phishing website, the user may be requested to provide a new mapping between the current website and the provided authentication input. For example, in some cases, the user may be on a new website and creating a new account on the new website using a password that is protected for another website secured by the security feature of the plug-in. In such cases, the user may be permitted to continue with interacting with the current website as the user has indicated that he/she understands the security risk involved with entering information on the current website.

In various embodiments, if the plug-in determines that the current web address of the phishing website does not match any of the identified web address(es) of the map, then the plug-in may prevent a submit button or log in button in the interface of the phishing website from being selected or performing its intended function. For example, the plug-in may display an alert message over the submit button or log in button to prevent the user from selecting such buttons. In some embodiments, the alert may allow the user to continue with entering the authentication information on the current website if the user chooses to continue.

The alert may have a button to allow the user to send a report to a security management group about the encounter with the current website. The security management group may be an entity tasked with monitoring phishing attempts. In some embodiments, the plug-in may be configured to send monthly/weekly/daily reports (or other periodic or non-periodic intervals) to the security management. The reports may indicate how many phishing attempts the plug-in prevented along with a list of phishing websites and web phishing addresses detected by the plug-in. The report may be disseminated and incorporated into anti-phishing plug-ins for other users. In some cases, the reports are provided to global browser vendors such that such phishing websites and phishing web addresses may be blocked on a global scale.

In various embodiments, the alert may be provided to the user according to user preferences. For example, the user may elect to have alerts of phishing attempts sent to an email address provided by the user. In some embodiments, the email may include an indication that an alert displayed in the interface of the phishing web page was ignored and sensitive information was provided to the phishing web page. For example, a parent may want an email alert when a child ignores the security alert and provides sensitive information to a phishing website. The parent may be able to respond by changing her/his password or other sensitive information after receiving such an email.

In some embodiments, if the plug-in determines that the phishing website web address matches one or more of the identified web addresses of the map, then the plug-in may display an alert in the user interface to indicate to the user that the current website corresponding to the current web address is not a phishing website but instead is a website protected by the security feature of the plug-in. Alerts are further discussed below with reference to FIGS. 3A and 3B and may generally be applicable in process 100.

In some embodiments, if the plug-in determines that the phishing website web address matches one or more of the identified web addresses of the map, then the access to the network connection prevented at block 105 may be re-granted. For example, the plug-in may grant network access for the browsing tab of a web browser application that is used to navigate to the current website. As a further example, the authentication input field that the user selected will be rendered active again or re-enabled such that any input provided to the authentication input field may be used in a submission of information on the current website.

Figure 2:
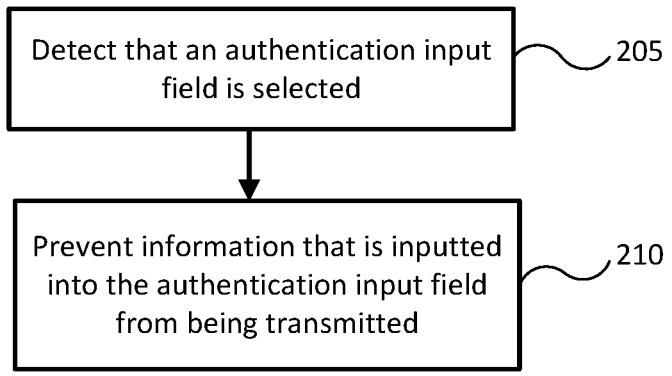
FIG. 2 illustrates a flow diagram of a process for preventing a phishing attempt in accordance with one or more embodiments of the present disclosure.

FIG. 2 illustrates a flow diagram of a process 200 for preventing intermediate data transfers between an interface of a phishing website and a phishing entity in accordance with one or more embodiments of the present disclosure.

Intermediate data transfers may be defined herein to include real-time data transfer while a user is inputting information into a field of the interface. For explanatory purposes, process 200 is primarily described herein with reference to FIG. 1; however, process 200 is not limited to FIG. 1. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed.

At block 205, an anti-phishing plug-in detects that an authentication input field of an interface of a current website has been selected by a user. For example, the plug-in may detect when the user has tapped the authentication input field in a browser application on a mobile device, placed a mouse cursor over the authentication input field and selected the authentication input field, and/or "tabbed" into the authentication input field. In various embodiments, the authentication input field may appear as part of a login prompt requesting a username and password. In various embodiments, the authentication input field may request a personal identification number (PIN), telephone number, email address, credit/debit card number, bank account information, and other sensitive information in a fillable form on the current website.

The current website may be a phishing website masquerading as a trusted party in an authentication process. The phishing entity, which controls or is otherwise associated with the phishing website, exploits the user's ability, or lack thereof, to accurately validate that they are accessing the correct web address each time they log in to a website to prevent sending their password to an untrusted server. At block 210, the plug-in prevents information that is input into the authentication input field from being transmitted to the phishing entity. For example, the plug-in prevents intermediate data transfer to the phishing entity as the user types in sensitive information into the authentication input field. Thus, the phishing entity cannot obtain knowledge of the characters that have been provided to the authentication input field before the user selects a submit/log in button or enter button. In various embodiments, the plug-in prevents the intermediate transfer of data to the phishing entity by disabling (e.g., disconnecting) a network connection of the browser application or a tab thereof. In an aspect, the browser application or tab may be rendered temporarily offline while the user inputs characters into the authentication input field.

Figure 3A:
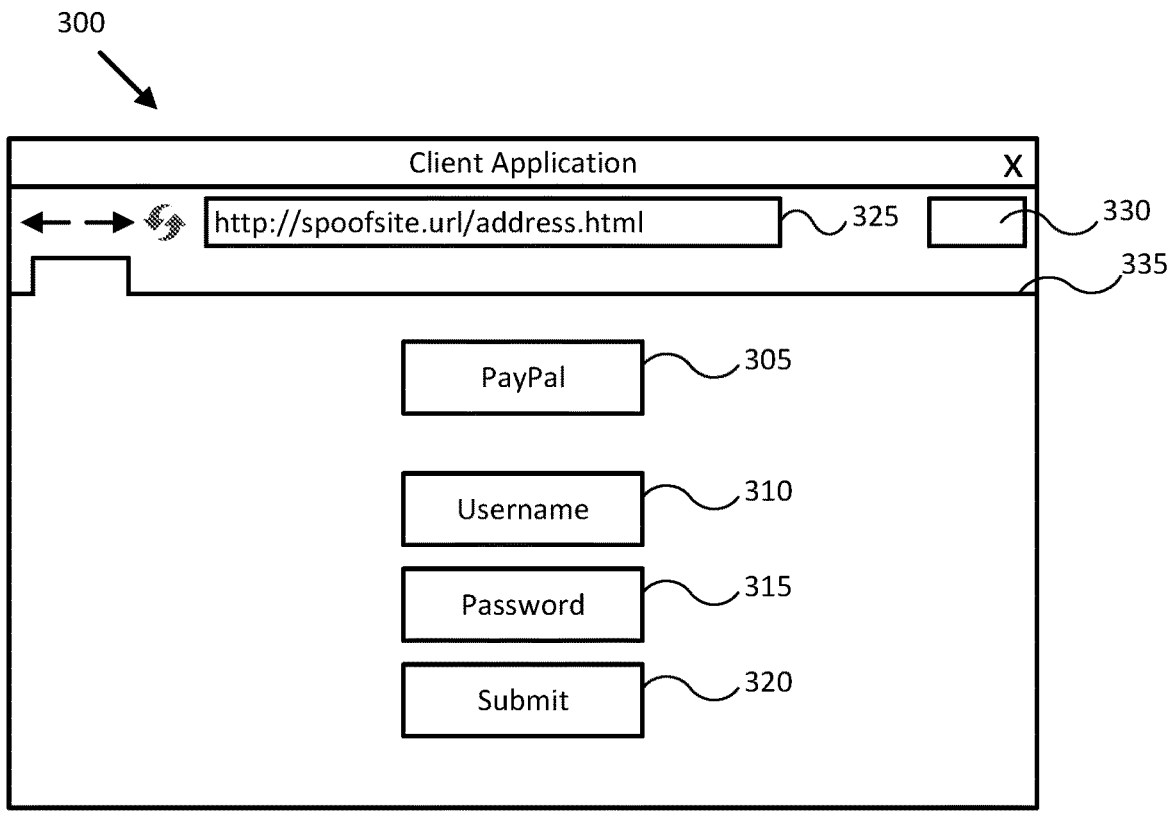
FIG. 3A illustrates an application interface for preventing phishing attempts in accordance with one or more embodiments of the present disclosure.

FIG. 3A illustrates an example client application interface 300 in which a phishing web page is displayed on a screen of a client device. Specifically, FIG. 3 illustrates an example client application interface 300 when a client application has an anti-phishing plug-in installed according to one or more embodiments of the present disclosure. For example, the client application may be a web browser. The web browser can be run on the client device (e.g., computing device such as a computer, touch-screen device, and so forth) being used by a user, and interface 300 is being displayed on the screen (e.g., monitor) of the client device. Interface 300 includes interface elements that perform actions when interacted with or executed by the user of the web browser.

The interface elements include an address bar 325, which is configured to show a web address of a web page and is configured to accept a web address from the user. The interface elements also include a tab 335. The web page is displayed in tab 335. Although FIG. 3 shows a single tab 335, the interface elements may include additional tabs capable of displaying additional web pages. In an embodiment, tab 335 displays authentication input fields 310 and 315 of the phishing web page. Authentication input fields 310 and 315 correspond to a "username" and "password" field. The interface elements may include a graphical element 305. Often, graphical element 305 may appear substantially similar to a logo of an entity that the user recognizes/trusts, for example, PayPal™. The interface elements may also include a submit button 320 or login button, which may add to the illusion that the user is on a legitimate website.

The interface elements also include a status indicator 330. Status indicator 330 may be configured to display a status of a safety feature of the plug-in related to the current web page. For example, status indicator 330 may display an indication of whether the safety feature is active for the current web page displayed in tab 335. In another example, status indicator 330 may display an indication that an authentication input field has been detected on the current web page. In yet another example, status indicator 330 may display an indication that the current web page is a phishing web page of a phishing website. Status indicator 330 may have different color indicators (e.g., red, green, grey, etc.) displayed thereon, where each color indicator corresponds to a status of the web page. In an aspect, the status of the web page may be one of the indications described above.

Figure 3B:
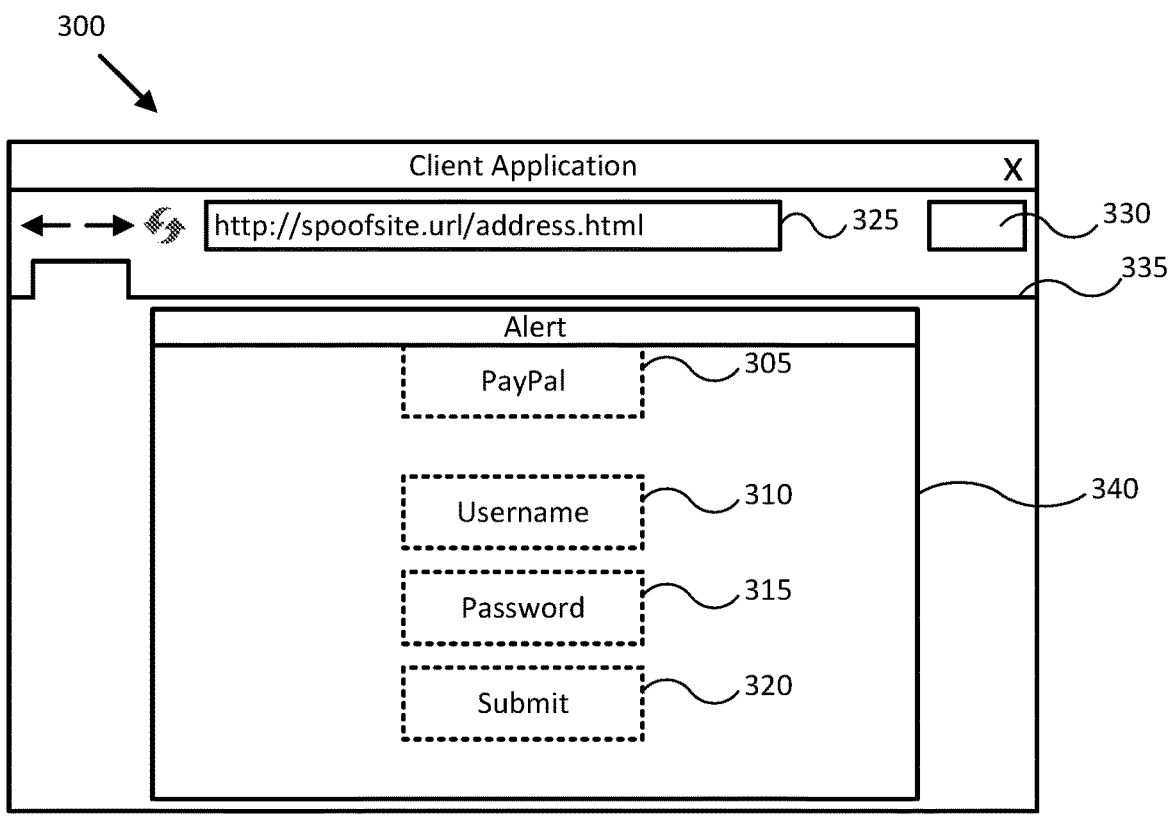
FIG. 3B illustrates an application interface including an alert for preventing phishing attempts in accordance with one or more embodiments of the present disclosure.

FIG. 3B illustrates an example client application interface 300 in which the plug-in displays an alert 340 according to one or more embodiments of the present disclosure. In some embodiments, alert 340 may be, may include, and/or may be part the alert described herein with reference to FIG. 1.

In various embodiments, if the anti-phishing plug-in determines that the current web address of the phishing website does not match any of the identified web addresses of the map (e.g., at block 125 of process 100 of FIG. 1), then the plug-in may display alert 340 in the client application interface 300 to notify/inform the user that there is a potential risk of having their sensitive information divulged on a phishing website. In some embodiments, if the plug-in determines that the phishing website web address matches one or more of the identified web addresses of the map, then the plug-in may display alert 340 in the user interface to indicate to the user that the current website corresponding to the current web address is not a phishing website and is actually a web address secured by the security feature of the plug-in. For example, alert 340 may be a temporary icon displayed adjacent to or on status indicator 330 to inform the user that the current website is recognized. In another example, alert 340 may be a translucent window displayed over the authentication fields of the phishing web page interface. Alert 340 may include selectable options for a user to block the current web address of the phishing website or allow for the user to continue browsing the current web page:

FIG. 4A illustrates an authentication input 400 including a plurality of input characters in accordance with one or more embodiments of the present disclosure. As shown in FIG. 4A, authentication input 400 is "aBc9!2" which represents sensitive information provided to an authentication input field. For example, authentication input 400 may be a username, password, and/or other authentication input described herein being provided to an authentication input field. The input "aBc9!2" is arbitrary and is merely for discussion purposes in the present disclosure as authentication input 400 may include any combination of alphanumeric characters and/or symbols.

In some embodiments, the anti-phishing plug-in receives each of the plurality of input characters of authentication input 400 which may have been provided to an authentication input field of a phishing website. The anti-phishing plug-in may process a subset of the plurality of input characters of authentication input 400. The subset of the plurality of input characters may include individual characters 405, 410, and 415. Individual characters 405, 410, and 415 may correspond to predetermined index values of the authentication input 400. As shown in FIG. 4A, individual characters 405, 410, and 415 correspond to the zeroth, first, and fourth index values of authentication input 400. The predetermined index values may be established during an initial configuration process, and/or adjusted as user preferences as described in the present disclosure.

In various embodiments, the anti-phishing plug-in generates a current hash value based on the subset of the plurality of input characters. In some embodiments, the individual input characters may be received in real-time (e.g., dynamically) and the current hash value may be updated with each received input character. In other words, the current hash value may be generated in real-time or dynamically with each character as each character is input into the authentication field. In some cases, the plug-in generates the current hash value once all the required characters, according to the predetermined index values have been provided into the authentication field. For example, as shown in FIG. 4A, once the individual input characters corresponding to the zeroth, first, and fourth index value have been input into the authentication input field, the current hash value may be generated before the individual character corresponding to the fifth index value is input into the authentication input field as it is unnecessary to generate a hash value that would correspond to a stored hash value. As such, in some embodiments, the anti-phishing plug-in may be configured to prevent additional characters from being entered into an authentication input field after the individual characters corresponding to the predetermined index values have been input and a determination is made as to whether the current website is a phishing website. Accordingly, a user may be stopped from entering an entire password before the anti-phishing plug-in can determine whether the website is a phishing website. Furthermore, a phishing entity may not receive an entire password with an intermediate data transfer as the plug-in may prevent the user from inputting an entire password before the plug-in can determine that the current website is a phishing website.

FIG. 4B illustrates an authentication input 400 including a plurality of input characters in accordance with one or more embodiments of the present disclosure. The description of FIG. 4B generally applies to FIG. 4A. However, FIG. 4B illustrates that a subset of the plurality of input characters may include individual characters 405, 410, 420, and 425. Individual characters 405, 410, 420, and 425 may correspond to predetermined index values of authentication input 401. As shown in FIG. 4B, individual characters 405, 410, 420, and 425 correspond to the zeroth, first, second, and fifth index values. Although FIGS. 4A and 4B show specific index values, the predetermined index values may be established during an initial configuration set up process, and/or adjusted as user preferences for the anti-phishing plug-in. The description with reference to FIG. 1, and specifically block 110, may generally be applied to FIGS. 4A and 4B.

Figure 5:
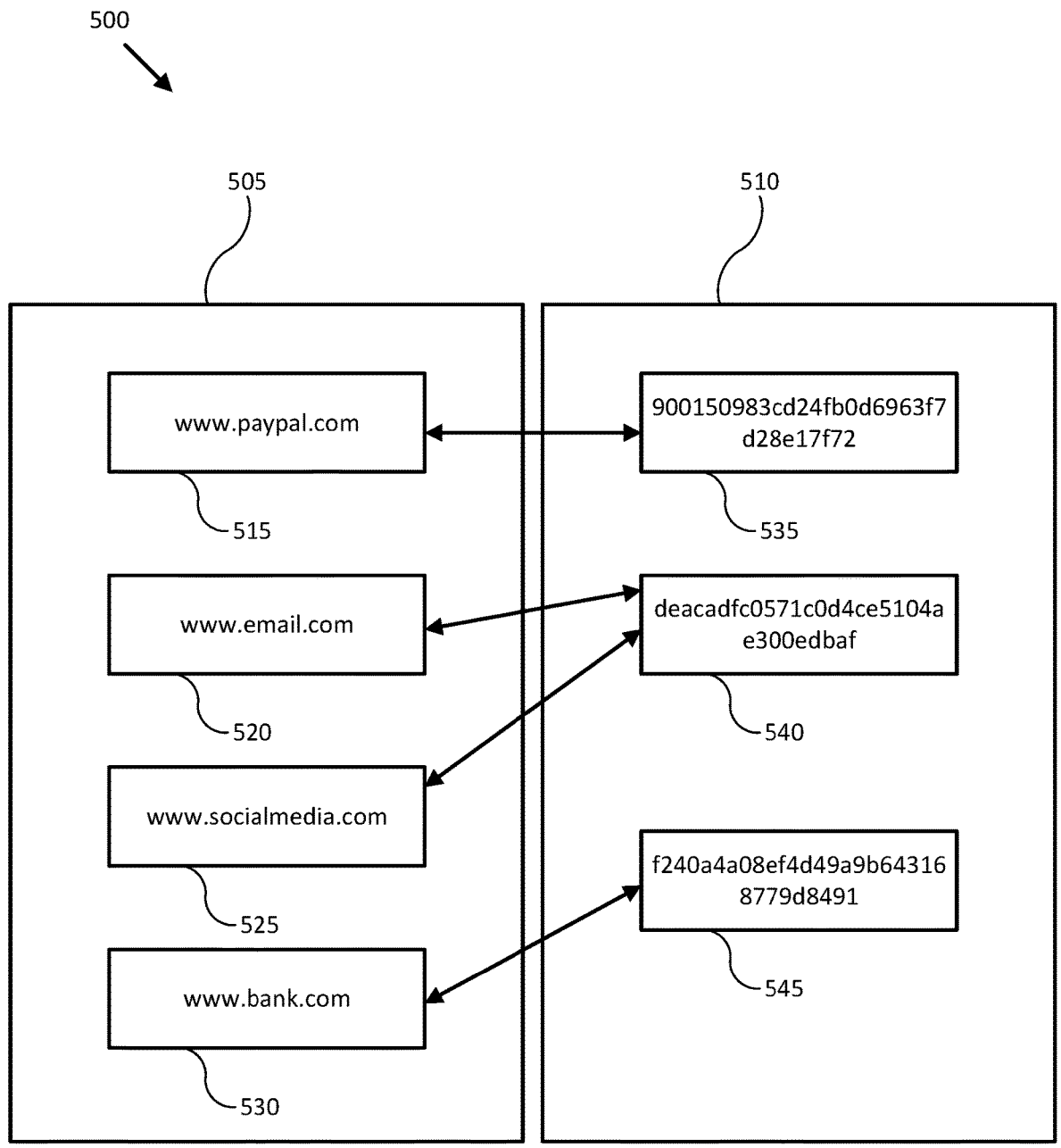
FIG. 5 illustrates an example map storing web addresses a hash values in accordance with one or more embodiments of the present disclosure.

FIG. 5 illustrates a map 500 that stores mapped web addresses 505 and mapped hash values 51Q in accordance with one or more embodiments of the present disclosure. In some embodiments, a configuration process is initiated after a user installs an anti-phishing plug-in (e.g., extension, add-on) for a client application. In some cases, the application may be a web browsing application. In the configuration process, the user may be required to set up user preferences for the plug-in's safety feature to prevent phishing attempts. The user may be presented with a GUI for creating, modifying, managing, configuring, and/or verifying parameters and options for configuration files of the anti-phishing plugin.

In some embodiments, the GUI prompts the user for a web address (e.g., website domain name, URL address, internet domain, internet reference, web page address) for which the user wants to enable the safety feature. For example, the user may provide web address 515 "www.paypal.com" in the GUI. The GUI may then prompt the user for specific characters of the user's password for the website associated with the provided web address. The characters requested may correspond to index values of the password for the website, where the password is a string of characters. For example, the GUI may request four characters of the user's password for the website, where the four characters correspond to a zero, first, fourth, and sixth index value of the password for the website. To illustrate this example, the user's password for the website may be "PayPal#PYPL" so the user would provide "Paa#" to the GUI as these characters correspond to the zeroth, first, fourth, and sixth index values of the password "PayPal#PYPL." The index values may be predetermined upon installation of the plug-in or, in some cases, the GUI may receive user preferences from the user, which are used to establish the predetermined index values that the user prefers. In this regard, the predetermined index values may be pre-configured, or selected by the user, to suit a desired application of embodiments of the present disclosure. For example, instead of a zeroth, first, fourth, and sixth index value, the plug-in may be configured to evaluate individual characters corresponding to index values of the last four characters of a password or the first four characters of a password.

After the plug-in receives the specific individual characters of the user's password (or other authentication input) for the website associated with the provided web address, the plug-in may generate a hash value based on the provided individual characters. Accordingly, the provided individual characters of the password, and the password itself, need not be stored in memory as the hash value may be used to uniquely identify the password. Once the web address has been provided and the hash value has been generated, the web address and the hash value may be mapped to each other and stored in a map 500 as mapped web address 515 and mapped hash value 535, respectively. The user may add additional mappings in a similar manner to that described above. For example, web address 530 "www.bank.com" may be mapped to hash value 545 in the manner described above. In an aspect, access to the map is exclusively limited to the plug-in for additional security measures.

As shown in FIG. 5, mapped web address 520 and 525 may be mapped to the same mapped hash value 540. In this case, the user uses the same password, or a password with the same characters at specific index values, for multiple websites (e.g., "www.email.com" and "www.socialmedia.com"). As such, map 500 may be configured to reduce redundancy by mapping a plurality of mapped web addresses to the same mapped hash value. After the map 500 has been established/configured, the user may enable the safety feature of the plug-in to actively prevent phishing attempts of authentication inputs for the mapped web addresses 505.

Figure 6:
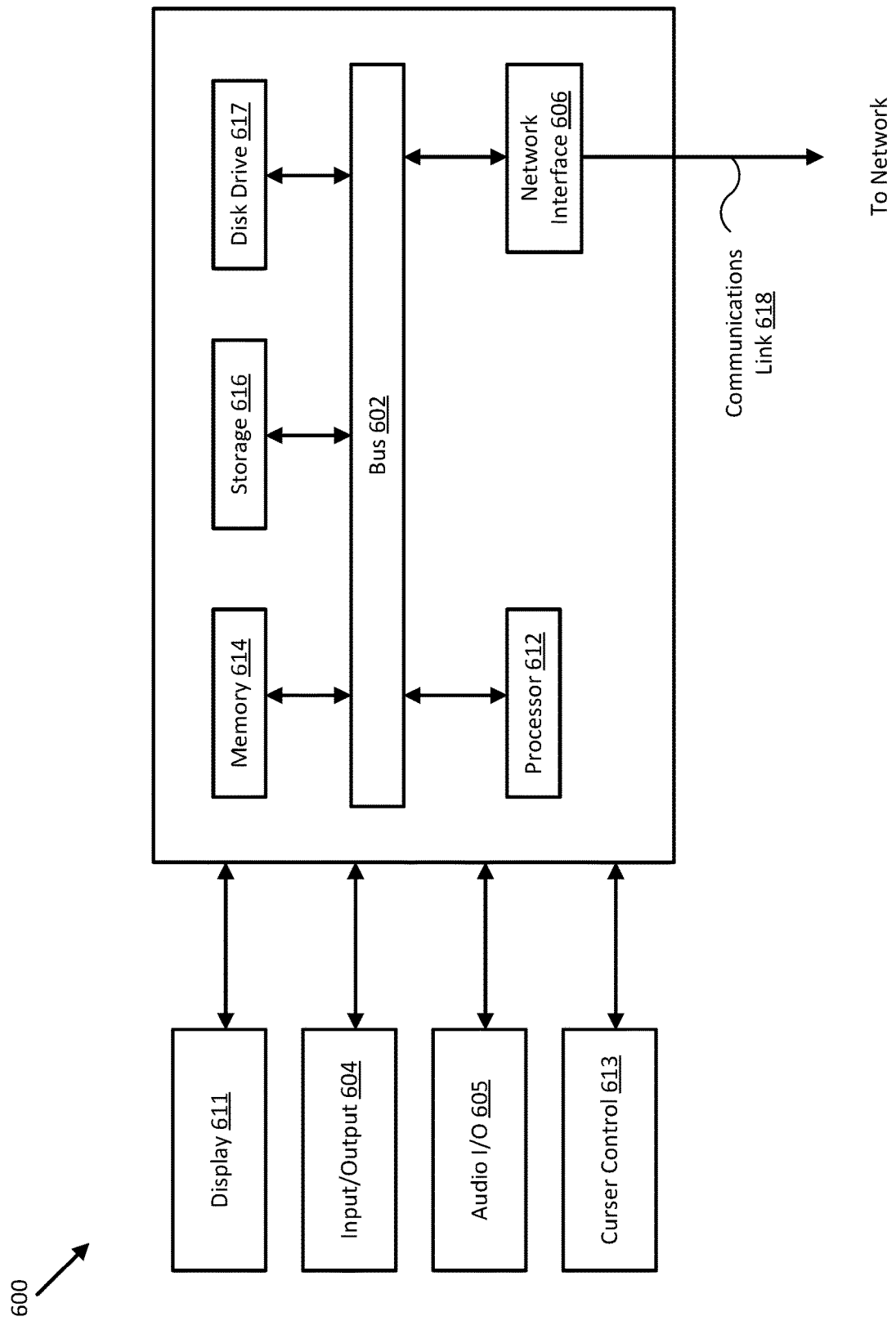
FIG. 6 illustrates a block diagram of a computer system in accordance with one or more embodiments of the present disclosure.

FIG. 6 illustrates a block diagram of a computer system 600 suitable for implementing one or more embodiments of the present disclosure. In various implementations, a user device may comprise a personal computing device (e.g., a personal computer, laptop, smart phone, tablet, augmented reality device, smart device, PDA, Bluetooth device, etc.) capable of communicating with a network. It should be appreciated that each of the devices utilized by users discussed herein may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities, such as an NFC reader to allow NFC communication with other devices as discussed herein. An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device and/or a provider server via the network. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
   a non-transitory memory storing a map that includes stored hash values and stored client application identifiers, wherein each of the stored hash values maps to at least one of the stored client application identifiers; and
   one or more hardware processors coupled to the non-transitory memory and configured to read instructions to cause the system to perform operations comprising:
     determining that a user interface, corresponding to a current application identifier, has one or more authentication input fields;
     based on detecting that an authentication input field of the one or more authentication input fields is selected, preventing the user interface from transmitting, over a network connection, information derived from the authentication input field to a server associated with the current application identifier;

generating a current hash value based on a subset of a plurality of input characters that have been input into the authentication input field, wherein each of the plurality of input characters corresponds to an index value, wherein the subset of the plurality of input characters comprises individual characters of the plurality of input characters, and wherein each index value of the individual characters corresponds to a predetermined index value;

comparing the current hash value with each of the stored hash values;

determining that the current hash value matches one or more of the stored hash values;

identifying one or more of the stored client application identifiers based on the one or more of the stored hash values and the map;

comparing the current application identifier to the one or more of the stored client application identifiers;

determining, based on the comparing the current application identifier to the one or more of the stored client application identifiers, whether the current application identifier matches any of the one or more of the stored client application identifiers; and in response to determining that the current application identifier does not match any of the one or more of the stored client application identifiers, displaying an alert in the user interface.

2. The system of claim 1, wherein the alert comprises a prompt to add a new mapping between the current application identifier and the current hash value.

3. The system of claim 1, where the operations further comprise:
in response to determining that the current application identifier matches the one or more of the stored client application identifiers, displaying an alert in the user interface indicating the match.

4. The system of claim 1, wherein the operations further comprise:
subsequent to the generating, preventing additional characters from being input to the authentication input field.

5. The system of claim 1, wherein the authentication input field is a control field that overlays the one or more authentication input fields.

6. The system of claim 1, wherein the operations further comprise:
in response to the determining that the user interface has one or more authentication input fields, displaying on the user interface an indication that a safety feature is active.

7. The system of claim 1, wherein the authentication field comprises a password field.

8. The system of claim 1, wherein the operations further comprise:
monitoring a number of alerts that have been displayed in the user interface within a predetermined duration of time; and
generating a security report based on the number of alerts.

9. A method comprising:
determining that a user interface has one or more authentication input fields, wherein the user interface corresponds to a current application identifier and is displayed in a display of a user device;
based on detecting that an authentication input field of the one or more authentication input fields is selected, preventing the user interface from exchanging information input in the authentication input field with a third-party device;
generating a current hash value based on a subset of a plurality of input characters that have been provided to the authentication input field;
comparing the current hash value with mapped hash values, wherein a map includes the mapped hash values respectively mapped to application identifiers;
determining that the current hash value matches one or more of the mapped hash values;
identifying one or more of the application identifiers based on the one or more of the mapped hash values and the map;
determining, based on a comparison between the current application identifier to the one or more of the application identifiers, whether the current application identifier matches any of the one or more of the application identifiers;
in response to determining that the current application identifier does not match any of the one or more of the application identifiers, displaying an alert in the user interface;
further in response to determining that the current application identifier does not match any of the one or more of the application identifiers, displaying in the user interface a query to map the current hash value to the current application identifier; and
mapping the current hash value to the current application identifier based on a user input received in the query indicating a request to map.

10. The method of claim 9, wherein the authentication input field comprises a payment card information field.

11. The method of claim 9, wherein the current application identifier comprises an internet address.

12. The method of claim 9, wherein the authentication input field comprises a password field or username field of the user interface.

13. The method of claim 9, wherein the alert prevents the authentication input field from receiving additional input characters.

14. The method of claim 9, further comprising:
monitoring a number of alerts that have been displayed in the user interface within a predetermined duration of time; and
generating a security report based on the number of alerts.

15. The method of claim 9, wherein the generating the current hash value based on the subset of the plurality of input characters is performed dynamically as the plurality of input characters are provided to the authentication input field.

16. A non-transitory machine-readable medium having stored thereon machine-readable instructions executable to cause a machine to perform operations comprising:
detecting that an authentication input field of one or more authentication input fields in a user interface corresponding to a current application is selected;
detecting one or more input characters through a user device into the authentication input field;
generating a current hash value based on a subset of the one or more input characters, wherein each of the one or more input characters corresponds to an index value, wherein the subset of the one or more input characters comprises individual characters, and wherein each index value of the individual characters corresponds to a predetermined index value;
comparing the current hash value with mapped hash values, wherein a map includes the mapped hash values respectively mapped to application identifiers;

determining that the current hash value matches one or more of the mapped hash values;

identifying one or more of the application identifiers based on the one or more of the mapped hash values and the map;

determining, based on a comparison between a current application identifier, of the current application, to the one or more of the application identifiers, whether the current application identifier matches any of the one or more of the application identifiers; and in response to determining that the current application identifier does not match any of the one or more of the application identifiers, displaying an alert in the user interface.

17. The non-transitory machine-readable medium of claim 16, wherein the user interface comprises a tab of a web browser.

18. The non-transitory machine-readable medium of claim 16, wherein the operations further comprise:

in response to determining that the current application identifier does not match any of the one or more of the application identifiers, displaying a prompt in the user interface to add a mapping between the current hash value and the current application identifier.

19. The non-transitory machine-readable medium of claim 16, wherein the operations further comprise:

in response to determining that the current application identifier matches the one or more of the application identifiers, displaying on the user interface an indication that a safety feature is no longer active.

20. The non-transitory machine-readable medium of claim 16, wherein the operations further comprise:

in response to determining that the current application identifier matches the one or more of the application identifiers, granting access to the user interface to access a network connection.

* * * * *